(12) United States Patent
Udo et al.

(10) Patent No.: US 10,439,459 B2
(45) Date of Patent: Oct. 8, 2019

(54) ROTOR

(71) Applicant: Mitsubishi Electric Corporation, Tokyo (JP)

(72) Inventors: Toyoaki Udo, Tokyo (JP); Satoru Akutsu, Tokyo (JP); Shusuke Hori, Tokyo (JP); Takanori Ichikawa, Tokyo (JP); Yuji Takizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 180 days.

(21) Appl. No.: 15/108,357

(22) PCT Filed: Feb. 10, 2014

(86) PCT No.: PCT/JP2014/053017
§ 371 (c)(1),
(2) Date: Jun. 27, 2016

(87) PCT Pub. No.: WO2015/118682
PCT Pub. Date: Aug. 13, 2015

(65) Prior Publication Data
US 2016/0322873 A1 Nov. 3, 2016

(51) Int. Cl.
*H02K 1/28* (2006.01)
*H02K 1/27* (2006.01)

(52) U.S. Cl.
CPC .............. *H02K 1/28* (2013.01); *H02K 1/278* (2013.01); *H02K 2201/06* (2013.01); *H02K 2213/03* (2013.01)

(58) Field of Classification Search
CPC ...... H02K 1/278; H02K 1/28; H02K 2201/06; H02K 2213/03

USPC .................................................... 310/156.28
See application file for complete search history.

(56) References Cited

U.S. PATENT DOCUMENTS

| 7,741,747 | B2 * | 6/2010 | Yamamura ............. H02K 1/278 310/156.01 |
| 2007/0138891 | A1 | 6/2007 | Hurst |
| 2009/0102304 | A1 | 4/2009 | Yamamura et al. |
| 2009/0224621 | A1 | 9/2009 | Okubo et al. |

(Continued)

FOREIGN PATENT DOCUMENTS

| JP | 09-009539 A | 1/1997 |
| JP | 2009-044797 A | 2/2009 |

(Continued)

OTHER PUBLICATIONS

International Search Report of PCT/JP2014/053017 dated Apr. 28, 2014.

(Continued)

*Primary Examiner* — Alex W Mok
(74) *Attorney, Agent, or Firm* — Sughrue Mion, PLLC; Richard C. Turner

(57) ABSTRACT

A rotor core of a rotor includes: a plurality of protrusions formed on at least a step-skew boundary side; and a tubular non-magnetic ring mounted on outer peripheries of a plurality of permanent magnets so as to cover the boundary. The non-magnetic ring includes a plurality of inner diameter bulging portions. Each of the permanent magnets and each of the protrusions are brought into abutment against the corresponding inner diameter bulging portions.

7 Claims, 8 Drawing Sheets

(56) References Cited

U.S. PATENT DOCUMENTS

| | | | |
|---|---|---|---|
| 2009/0251023 A1 | 10/2009 | Nakano et al. | |
| 2010/0018032 A1* | 1/2010 | Yamamura | H02K 1/278 29/598 |
| 2012/0286593 A1* | 11/2012 | Yokogawa | H02K 1/278 310/43 |
| 2012/0293024 A1* | 11/2012 | Yokogawa | H02K 1/278 310/43 |
| 2012/0313474 A1 | 12/2012 | Yamamura et al. | |
| 2013/0214620 A1* | 8/2013 | Kobayashi | H02K 1/278 310/43 |
| 2013/0239378 A1* | 9/2013 | Kuroiwa | B23P 15/04 29/23.51 |
| 2013/0257184 A1 | 10/2013 | Haga et al. | |
| 2013/0257211 A1* | 10/2013 | Haga | H02K 1/278 310/156.12 |
| 2013/0342064 A1* | 12/2013 | Park | H02K 1/27 310/156.12 |
| 2013/0342066 A1 | 12/2013 | Taniguchi et al. | |

FOREIGN PATENT DOCUMENTS

| | | |
|---|---|---|
| JP | 2009-106065 A | 5/2009 |
| JP | 2009-254103 A | 10/2009 |
| JP | 2011-055706 A | 3/2011 |
| JP | 2013-188075 A | 9/2013 |
| TW | 412100 U | 11/2000 |
| WO | 2011/155042 A1 | 12/2011 |

OTHER PUBLICATIONS

Communication dated Aug. 22, 2017 from the European Patent Office in counterpart application No. 14881481.7.

* cited by examiner

ROTOR

CROSS REFERENCE TO RELATED APPLICATIONS

This is a National Stage of International Application No. PCT/JP2014/053017 filed Feb. 10, 2014, the contents of which are incorporated herein by reference in its entirety.

TECHNICAL FIELD

The present invention relates to a rotor for a rotary electric machine.

BACKGROUND ART

Among rotors for a rotary electric machine, there is given a rotor including a non-magnetic ring configured to retain permanent magnets mounted on a periphery of the rotor.

For example, in Patent Literature 1, there is disclosed a rotor including at least a rotor core, a plurality of magnets, and a non-magnetic ring. The plurality of magnets are fixed to an outer periphery of the rotor core so as to be arrayed in a circumferential direction. The non-magnetic ring is provided so as to surround the plurality of magnets from outside.

Further, in Patent Literature 2, there is disclosed a step-skew configuration, in which upper and lower stages of a rotor are shifted by a predetermined angle in a circumferential direction so as to reduce cogging torque and torque ripples.

CITATION LIST

Patent Literature

[PTL 1] JP 2009-106065 A
[PTL 2] JP 2011-55706 A

SUMMARY OF INVENTION

Technical Problem

In the case of the step-skew configuration of the rotor as disclosed in Patent Literature 2, when the non-magnetic ring is brought into contact with the permanent magnets as in the configuration disclosed in Patent Literature 1, a difference in circumferential length of the non-magnetic ring becomes significant between the vicinity of a step-skew boundary and the other portion, and hence an excessive load is generated in the non-magnetic ring. As a result, the non-magnetic ring may be buckled or damaged. Further, when the non-magnetic ring to be used is formed such that both sides of the step skew have the maximum diameter in order to avoid the buckling or damage, press contact between the non-magnetic ring and the magnets may become insufficient in turn.

The present invention has been made in view of the above, and has an object to provide a rotor for a rotary electric machine, which is capable of avoiding increase in distortion amount of a non-magnetic ring in the vicinity of a step-skew boundary, thereby being capable of avoiding buckling or damage.

Solution to Problem

In order to achieve the above-mentioned object, according to one embodiment of the present invention, there is provided a rotor having a plurality of magnetic poles and a step-skew structure with two or more stages, the rotor including a rotor core including: a plurality of protrusions formed on at least a step-skew boundary side; and a tubular non-magnetic ring mounted on outer peripheries of the plurality of magnetic poles so as to cover the step-skew boundary, the non-magnetic ring including a plurality of inner diameter bulging portions, each of the plurality of magnetic poles and each of the plurality of protrusions being brought into abutment against the corresponding inner diameter bulging portions.

Advantageous Effects of Invention

According to the present invention, it is possible to avoid the increase in distortion amount of the non-magnetic ring in the vicinity of the step-skew boundary, thereby being capable of avoiding the buckling or the damage.

DESCRIPTION OF EMBODIMENTS

Figure 1:
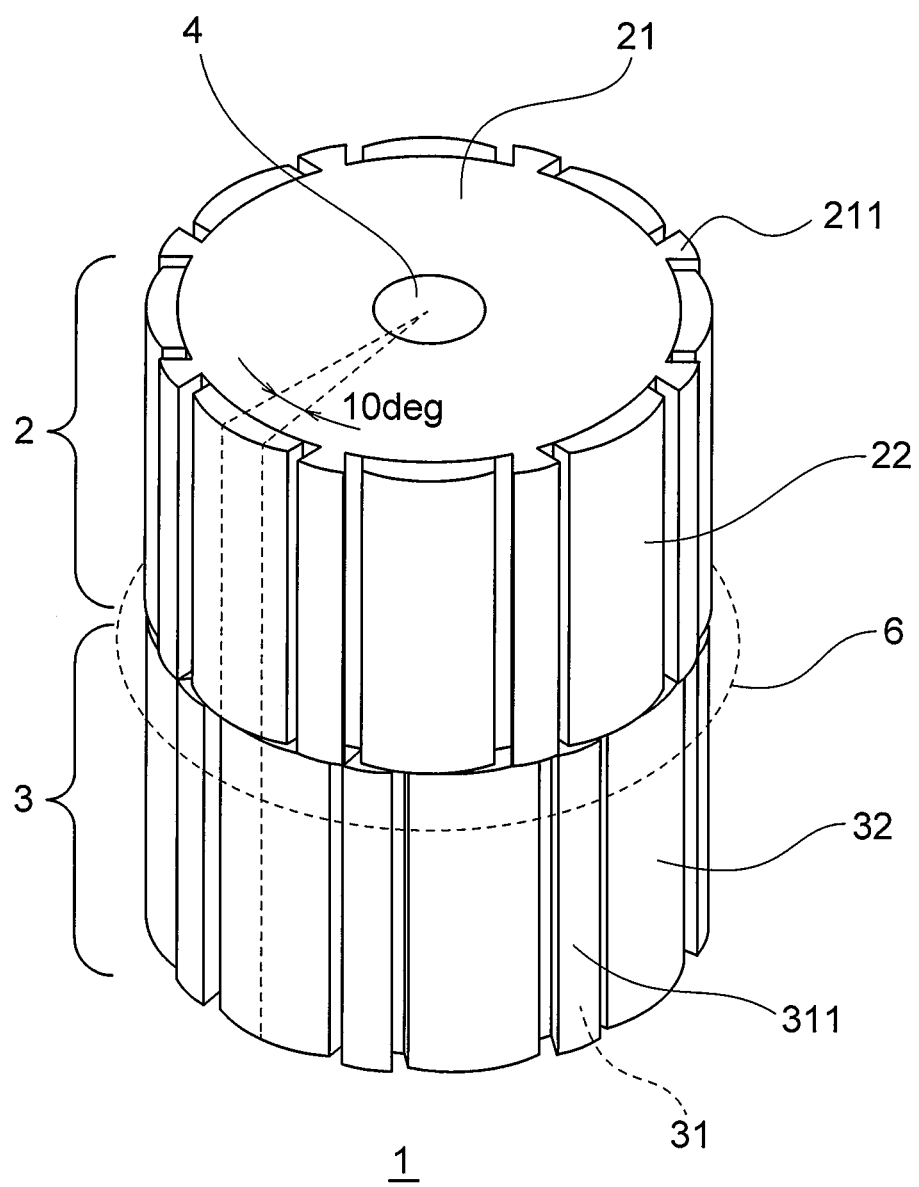
FIG. 1 is a perspective view of a rotor for a rotary electric machine (before a non-magnetic ring is mounted) according to a first embodiment of the present invention.

Now, embodiments of the present invention are described with reference to the accompanying drawings. Note that, in the drawings, the same reference symbols represent the same or corresponding parts.

First Embodiment

Figure 2:
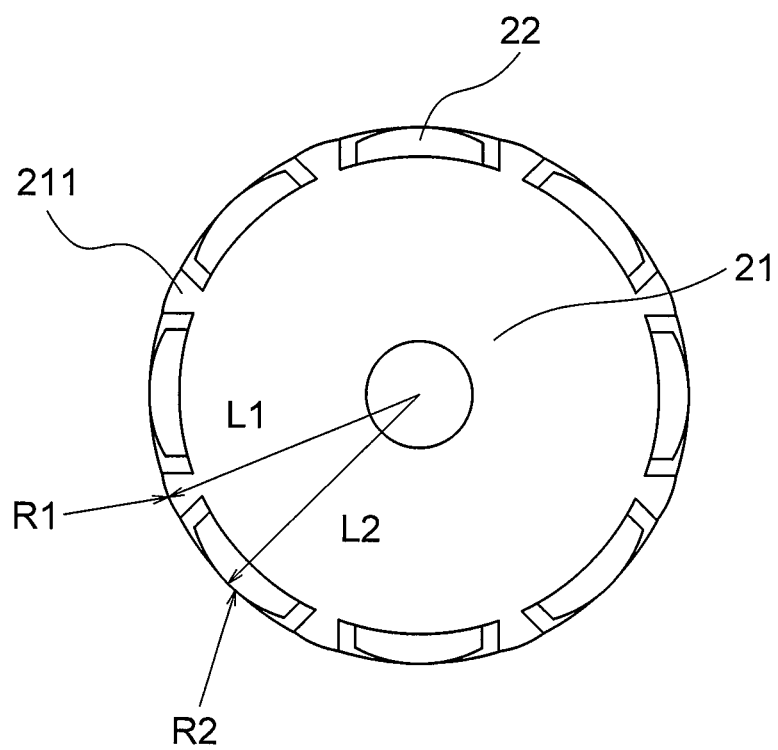
FIG. 2 is a plan view of the rotor for a rotary electric machine (before the non-magnetic ring is mounted) according to the first embodiment of the present invention.
Figure 3:
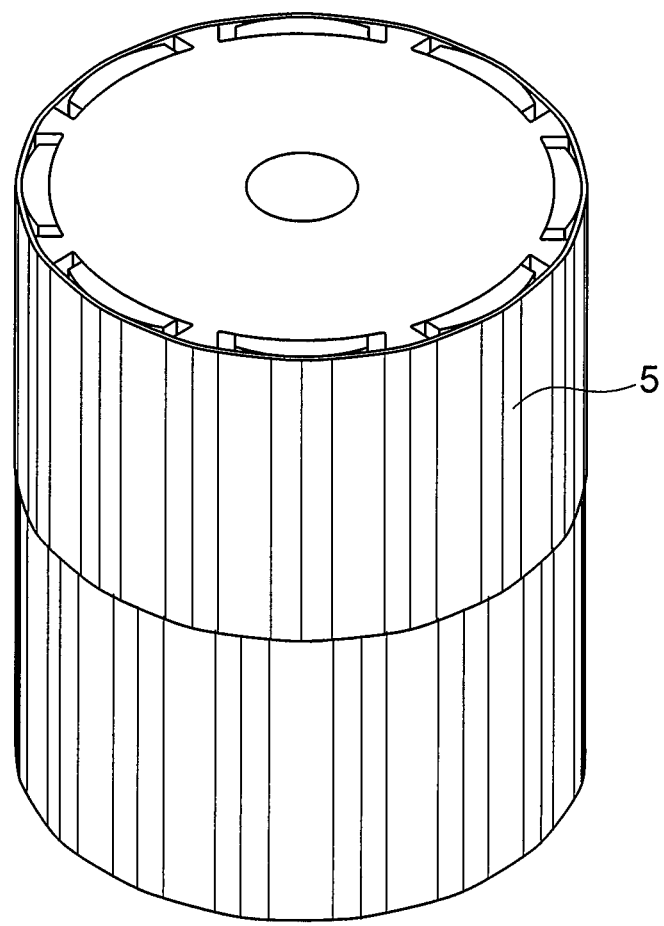
FIG. 3 is a perspective view of the rotor for a rotary electric machine according to the first embodiment of the present invention.
Figure 4:
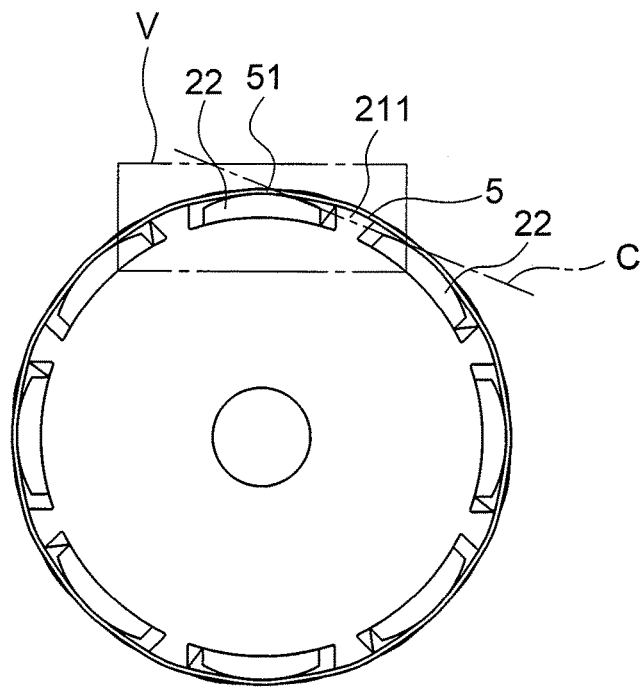
FIG. 4 is a plan view of the rotor for a rotary electric machine according to the first embodiment of the present invention.
Figure 5:
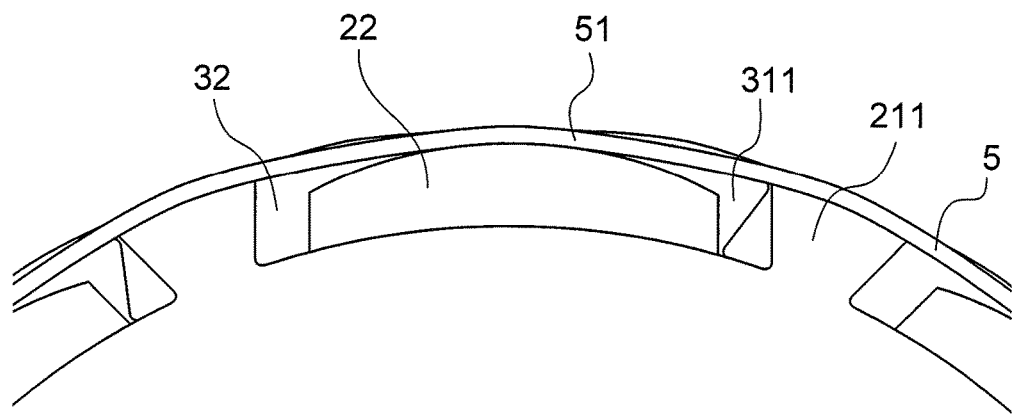
FIG. 5 is an enlarged view of the part V of FIG. 4.

FIG. 1 and FIG. 2 are a perspective view and a plan view of a rotor for a rotary electric machine according to a first embodiment of the present invention before a non-magnetic ring is mounted, respectively. FIG. 3 is a perspective view of the rotor for a rotary electric machine according to the first embodiment. FIG. 4 is a top view of the rotor for a rotary electric machine according to the first embodiment. FIG. 5 is an enlarged view of the part V of FIG. 4.

As illustrated in FIG. 1 to FIG. 5, a rotor 1 includes a rotor first stage portion 2 and a rotor second stage portion 3. The rotor first stage portion 2 and the rotor second stage portion 3 are arrayed in an extending direction of a rotor shaft 4. Further, the rotor first stage portion 2 and the rotor second stage portion 3 have the same configuration except that the rotor first stage portion 2 and the rotor second stage portion 3 are shifted by a step-skew angle of 10° in a circumferential direction (rotational direction).

The rotor first stage portion 2 includes a rotor core 21 and a plurality of permanent magnets (magnetic poles) 22. The rotor core 21 is formed by laminating a plurality of magnetic steel sheets (made of a magnetic material) each having a plurality of protrusions 211 arranged at regular intervals in the circumferential direction. Each of the plurality of permanent magnets 22 is bonded between a corresponding pair of protrusions 211, and is arranged out of contact with the pair of protrusions 211.

The rotor second stage portion 3 is formed in the same manner as the rotor first stage portion 2. The rotor second stage portion 3 includes a rotor core 31 and a plurality of permanent magnets (magnetic poles) 32. The rotor core 31 is formed by laminating a plurality of magnetic steel sheets (made of a magnetic material) each having a plurality of protrusions 311 arranged at regular intervals in the circumferential direction. Each of the plurality of permanent magnets 32 is bonded between a corresponding pair of protrusions 311, and is arranged out of contact with the pair of protrusions 311.

The plurality of permanent magnets and the plurality of protrusions are arranged at equiangular pitches in the circumferential direction. In the first embodiment that is an example of the present invention, there is exemplified a case where the number of stages is two and the number of magnetic poles is eight. Thus, in each of the rotor first stage portion 2 and the rotor second stage portion 3, eight permanent magnets 22 or 32 and eight protrusions 211 or 311 are provided.

The rotor core of the present invention has the plurality of protrusions at least on a boundary 6 side. In the first embodiment that is an example, each of the protrusions 211 and 311 extends continuously over the total length of a corresponding one of the rotor first stage portion 2 and the rotor second stage portion 3 in a rotation axis direction. In other words, each of the permanent magnets 22 and 32 extends continuously over the total length of a corresponding one of the rotor first stage portion 2 and the rotor second stage portion 3 in the rotation axis direction, and the length of each of the protrusions 211 and 311 (length in the rotation axis direction) is equal to the length of each of the permanent magnets 22 and 32 (length in the rotation axis direction). Further, in plan view, the outer peripheral surface of each of the protrusions 211 and 311 is formed into an arc shape that is curved so as to bulge radially outward.

Further, in each of the rotor first stage portion 2 and the rotor second stage portion 3, when a radial distance from an axial center of the rotor shaft 4 (rotation center of the rotor) to the outermost portion of each of the protrusions 211 and 311 of the rotor cores 21 and 31 is represented by L1, a curvature radius of each of the protrusions 211 and 311 is represented by R1, a radial distance from the axial center of the rotor shaft 4 (rotation center of the rotor) to the outermost portion of each of the magnetic poles (permanent magnets 22 and 32) is represented by L2, and a curvature radius of each of the magnetic poles (permanent magnets 22 and 32) is represented by R2, the respective portions concerned are formed so as to satisfy relationships of distance L1≤distance L2 and curvature radius R1=curvature radius R2.

Further, the rotor 1 includes a non-magnetic ring 5. The non-magnetic ring 5 is a tubular member made of a non-magnetic material (for example, stainless steel) to have a substantially regular hexadecagonal shape in plan view (when viewed along the extending direction of the rotor shaft 4).

The non-magnetic ring 5 is mounted so as to cover outer peripheries of the eight permanent magnets 22 and the eight permanent magnets 32 of the rotor first stage portion 2 and the rotor second stage portion 3, outer peripheries of the eight protrusions 211 and the eight protrusions 311 of the rotor first stage portion 2 and the rotor second stage portion 3, and an outer periphery of the boundary 6 between the rotor first stage portion 2 and the rotor second stage portion 3.

The non-magnetic ring 5 includes sixteen arc-shaped inner diameter bulging portions 51 as many as the sum of the number of magnetic poles and the number of protrusions of the rotor core. Thus, the outer shape (outer diameter) of the non-magnetic ring 5 has a substantially regular hexadecagonal loop outline connecting the plurality of inner diameter bulging portions 51 as gentle ridge lines.

The inner peripheral surfaces (radially inner surfaces) of the inner diameter bulging portions 51 of the non-magnetic ring 5 are held in contact with the outer peripheral surfaces of each of the plurality of magnetic poles (permanent magnets 22 and 32) and each of the plurality of protrusions of the rotor core, to thereby apply a radially-inward urging force to each of the magnetic poles.

Further, when a circumferential length of an imaginary circumscribed circle, which is held in contact with all of the plurality of magnetic poles and the plurality of protrusions of the rotor core, is represented by L3, and an inner circumferential length of the non-magnetic ring 5 is represented by L4, the non-magnetic ring 5 is formed so as to satisfy a relationship of circumferential length L3 of imaginary circumscribed circle>inner circumferential length L4 of non-magnetic ring.

Further, the protrusion of the rotor core protrudes radially outward with respect to a common tangential line C, which is held in contact with a pair of magnetic poles located adjacent to each other across the protrusion.

Now, general description is made of the configurations of the magnetic poles, the protrusions of the rotor core, and the non-magnetic ring. When the number of poles, namely the number of magnetic poles of the rotor for a rotary electric machine is represented by n, the number of protrusions of the rotor core is n, and the non-magnetic ring is formed to have a regular 2n-sided polygonal shape (regular m-sided polygonal shape). Further, the magnetic poles and the protrusions of the rotor core are arranged at equal pitches. In plan view, an angle θ between a radial line passing through the axial center of the rotor shaft 4 and through a center portion of the magnetic pole and a radial line passing through the axial center of the rotor shaft 4 and through a center portion of the protrusion is expressed as follows.

$$\theta = 360°/2n \quad (1)$$

Next, a relationship between the number of sides of the non-magnetic ring and the distortion amount relative to the step-skew angle is described with reference to FIG. 6 and FIG. 7.

Figure 6:
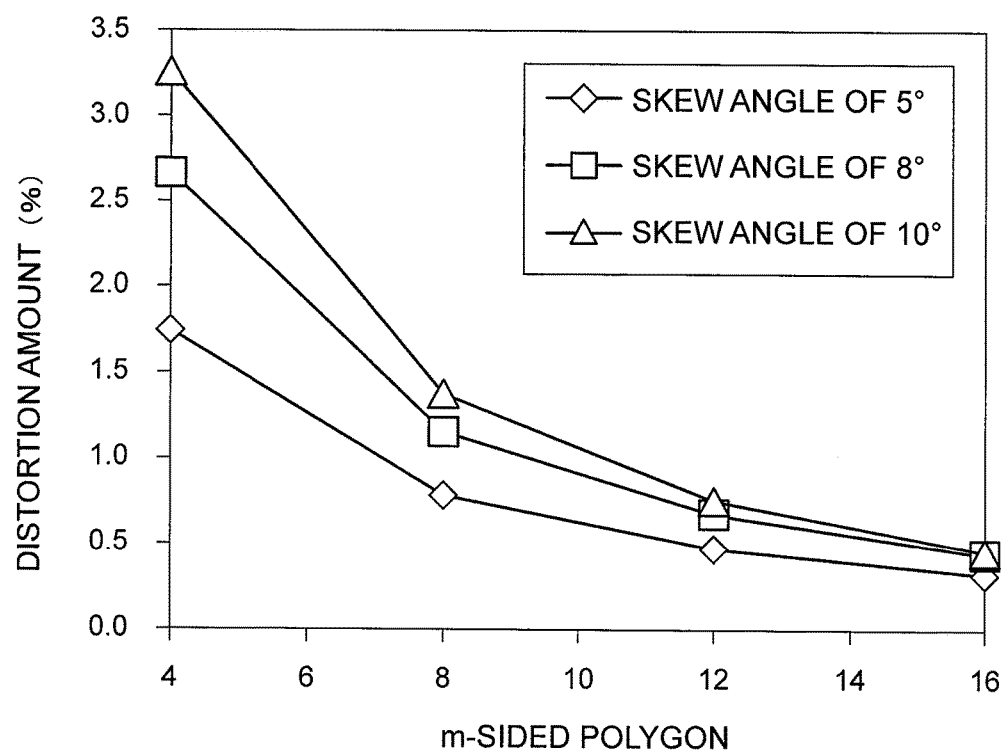
FIG. 6 is a graph for showing the amounts of distortion caused in non-magnetic rings having respective polygonal shapes at step-skew angles of 5°, 8°, and 10°.

FIG. 6 is a graph for showing the amounts of distortion caused in non-magnetic rings having respective polygonal shapes at step-skew angles of 5°, 8°, and 10°. As schematically illustrated in FIG. 7 and FIG. 8, when a circumferential length of the rotor core at a portion other than the step-skew boundary is represented by L5, and a circumferential length at the step-skew boundary 6 is represented by L6, a distortion amount γ of the non-magnetic ring is expressed by Expression (2).

$$\gamma = (L6-L5)/L5 \times 100 \quad (2)$$

Further, when a half of the length of each diagonal line of an m-sided polygon is represented by a, an angle between the diagonal lines is represented by θm, and a step-skew angle is represented by θ', the circumferential lengths L5 and L6 are expressed by Expression (3) and Expression (4), respectively.

$$L5 = m \times a \times \{2 \times (1-\cos\theta m)\}^{(1/2)} \quad (3)$$

$$L6 = m \times a \times \{2 \times (1-\cos\theta')\}^{(1/2)} + m \times a \times \{2 \times (1-\cos(\theta m-\theta'))\}^{(1/2)} \quad (4)$$

Then, Expression (2) can be expressed as Expression (5) with use of Expression (3) and Expression (4).

$$\gamma = \{(1-\cos\theta')^{(1/2)} + (1-\cos(\theta m-\theta'))^{(1/2)}\}/\{(1-\cos\theta m)^{(1/2)}\} \quad (5)$$

Figure 7:
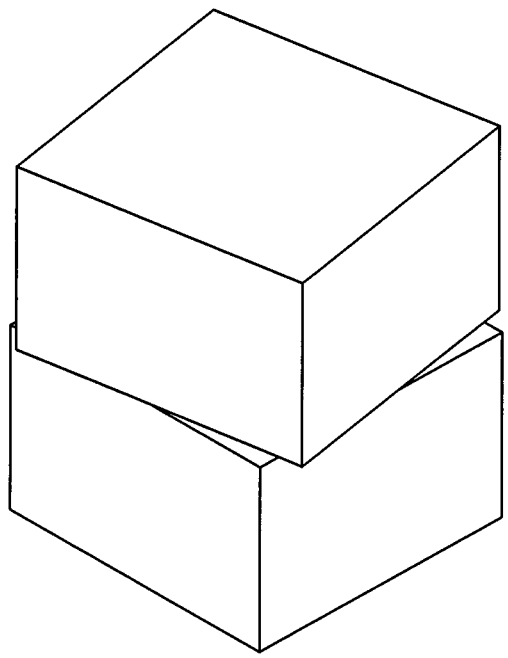
FIG. 7 is a perspective view of a core having a square shape at the step-skew angle of 10°.
Figure 8:
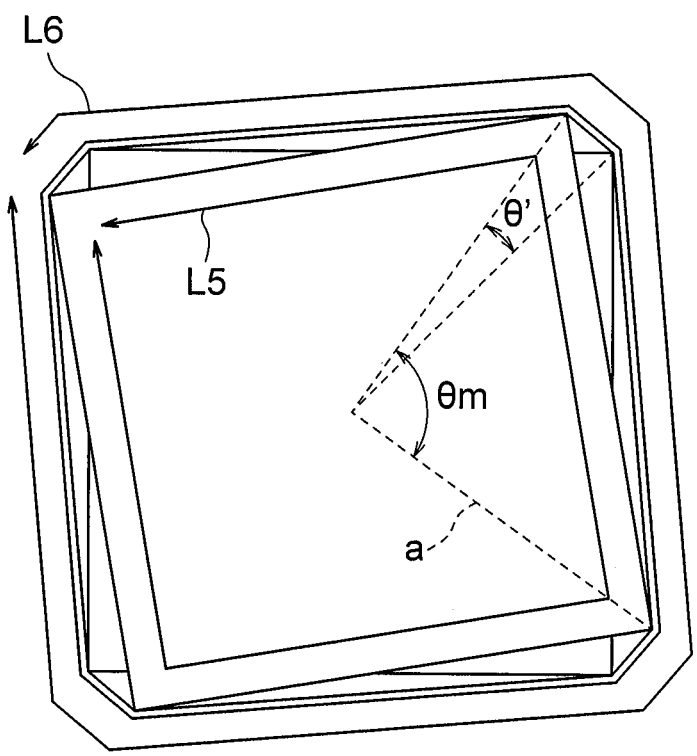
FIG. 8 is a view for illustrating the core having a square shape and the non-magnetic ring at the step-skew angle of 10°.

FIG. 7 and FIG. 8 are views of an example in a case where the rotor cores are square and the step-skew angle is 20°, namely explanatory views of a case where m=4, θm=90°, and θ'=10°. As shown in FIG. 6, it is understood that the amount of distortion caused in the non-magnetic ring is increased as the number of sides is decreased, and is also increased as the step-skew angle is increased. In the configuration of FIG. 7 and FIG. 8, the amount of distortion caused in the non-magnetic ring is about 3.2%.

In the case of the configuration illustrated in FIG. 1 to FIG. 5, the step-skew angle is 10° and the shape of the deformed non-magnetic ring is a hexadecagonal shape. That is, this case is an example in which m=16, θm=22.5°, and θ'=10°. Thus, the amount of distortion caused in the non-magnetic ring is about 0.5%. In contrast, in a configuration in a case where the step-skew angle is the same angle of 10° and the rotor core has no protrusion, namely the shape of the deformed non-magnetic ring is an octagonal shape, that is, in a configuration in which m=8, θm=45°, and θ'=10°, the amount of distortion caused in the non-magnetic ring is about 1.4%. Thus, in the first embodiment in which the rotor core has the protrusions, the amount of distortion that may be caused in the non-magnetic ring can be reduced by about 60% as compared to the case where the rotor core has no protrusion.

As described above, in the first embodiment, each of the protrusions is provided between the magnets of the rotor core, and the non-magnetic ring is arranged on the magnets and the protrusions so that both of the magnets and the protrusions of the rotor core are brought into abutment against the non-magnetic ring. Thus, the magnets and the protrusions of the rotor core are brought into abutment against the non-magnetic ring at a larger number of points, thereby being capable of deforming the non-magnetic ring into a polygonal shape having a larger number of sides. Further, when the non-magnetic ring is deformed into a polygonal shape having a larger number of sides as described above, the increase in distortion amount of the non-magnetic ring in the vicinity of the step-skew boundary along with the step skew can be avoided without requiring increase in number of components or increase in distance between the magnets and the stator, thereby being capable of avoiding buckling or damage.

Second Embodiment

Figure 9:
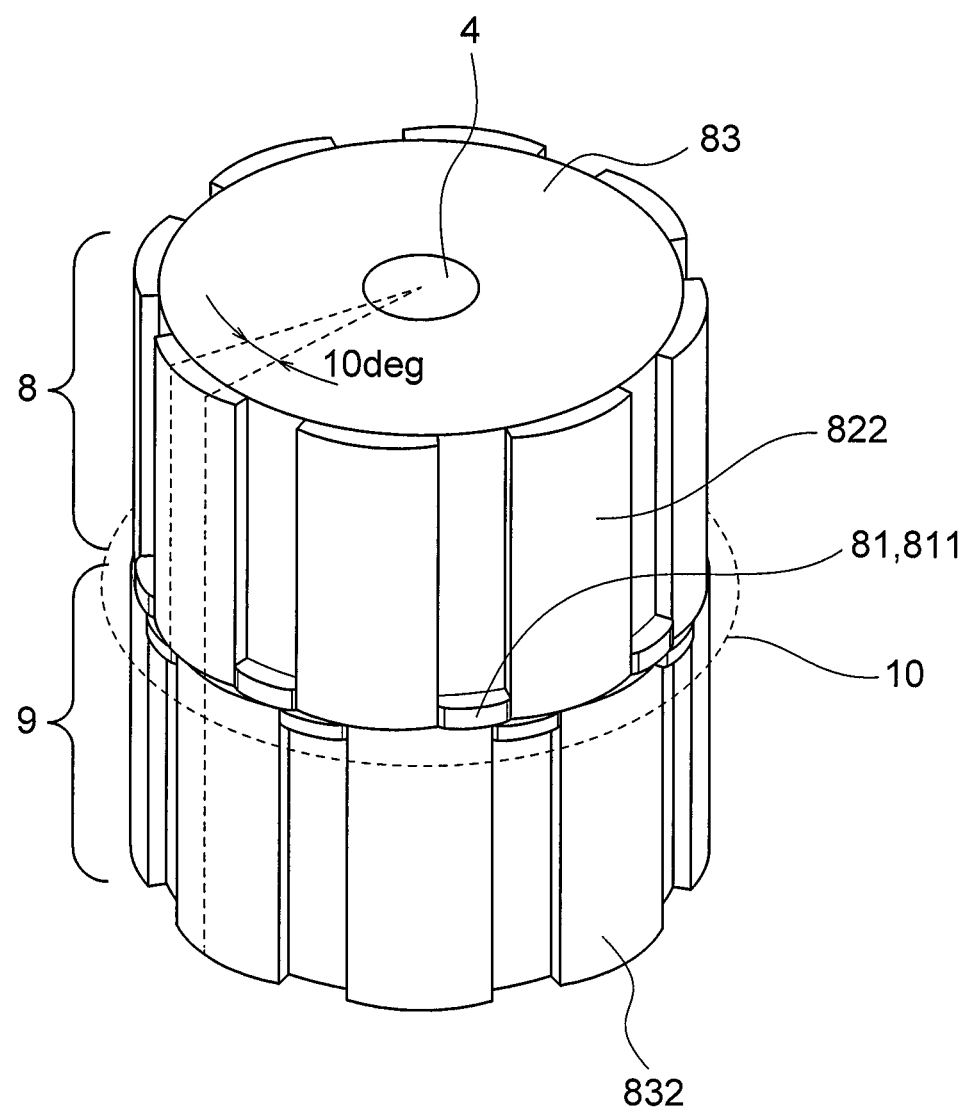
FIG. 9 is a perspective view of a rotor for a rotary electric machine (before a non-magnetic ring is mounted) according to a second embodiment of the present invention.
Figure 10:
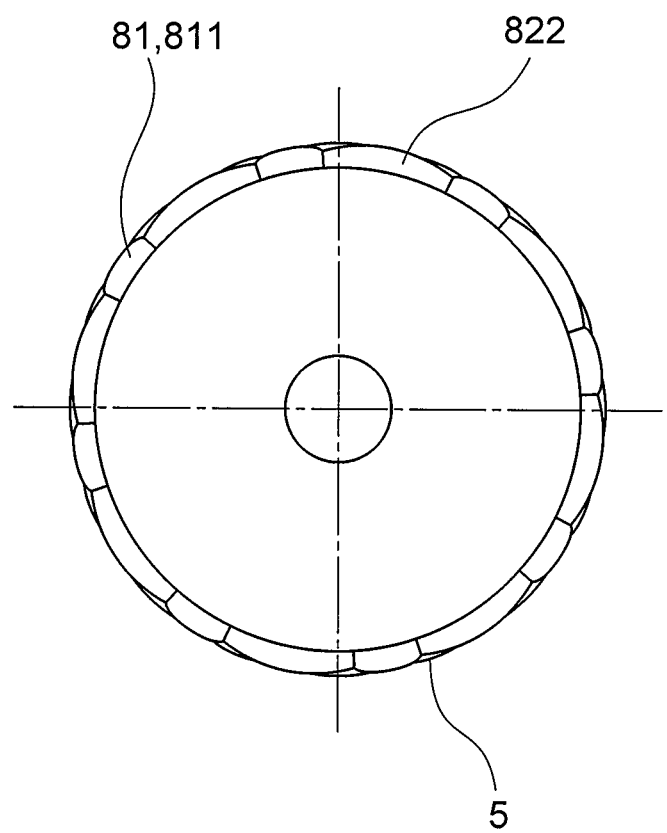
FIG. 10 is a plan view of the rotor for a rotary electric machine according to the second embodiment of the present invention.

Next, referring to FIG. 9 and FIG. 10, a second embodiment of the present invention is described. FIG. 9 is a perspective view of a rotor for a rotary electric machine (before a non-magnetic ring is mounted) according to the second embodiment of the present invention. FIG. 10 is a plan view of the rotor for a rotary electric machine according to the second embodiment of the present invention. Note that, the second embodiment is the same as the above-mentioned first embodiment except for the parts described below.

The second embodiment has a feature in that the protrusions are provided partially in the rotation axis direction of the rotor (at least on the boundary side). FIG. 9 and FIG. 10 are illustrations of an example of such a feature of the second embodiment. As in the first embodiment, a rotor 7 of the second embodiment includes a rotor first stage portion 8 and a rotor second stage portion 9. The rotor first stage portion 8 and the rotor second stage portion 9 are arrayed in the extending direction of the rotor shaft 4. Further, the rotor first stage portion 8 and the rotor second stage portion 9 have the same configuration except that the rotor first stage portion 8 and the rotor second stage portion 9 are shifted by a step-skew angle of 10° in the circumferential direction (rotational direction).

The rotor first stage portion 8 includes a rotor core and a plurality of permanent magnets 822. The rotor core of the rotor first stage portion 8 includes a rotor core portion 83 formed of magnetic steel sheets (made of a magnetic material) each having no protrusion, and a rotor core portion 81 made of a non-magnetic material having protrusions 811.

Similarly, the rotor second stage portion 9 also includes a rotor core and a plurality of permanent magnets 822. The rotor core of the rotor second stage portion 9 also includes a rotor core portion 83 formed of magnetic steel sheets (made of a magnetic material) each having no protrusion, and a rotor core portion 81 made of a non-magnetic material having protrusions 811.

The rotor core portion 81 of the rotor first stage portion 8 and the rotor core portion 81 of the rotor second stage portion 9 are positioned in a region on a boundary 10 side between the rotor first stage portion 8 and the rotor second stage portion 9. That is, the protrusions 811 of the rotor first stage portion 8 and the protrusions 811 of the rotor second stage portion 9 are provided only on the boundary 10 side between the rotor first stage portion 8 and the rotor second stage portion 9.

Further, the side surfaces of the permanent magnets 822 of the rotor first stage portion 8 are held in contact with the side surfaces of the protrusions 811, and the side surfaces of the permanent magnets 832 of the rotor second stage portion 9 are also held in contact with the side surfaces of the protrusions 811.

According to the above-mentioned rotor for a rotary electric machine of the second embodiment, the amount of distortion that may be caused in the non-magnetic ring in the vicinity of the step-skew boundary can be reduced for the same reason as that of the first embodiment. In addition, the positions of the permanent magnets in the circumferential direction can securely be regulated through the contact of the permanent magnets with the protrusions of the rotor core. Further, torque reduction that may be caused by leakage of magnetic fluxes from the permanent magnets can be avoided through the formation of the rotor core portion having the protrusions with use of a non-magnetic material.

Although the details of the present invention are specifically described above with reference to the preferred embodiments, it is apparent that persons skilled in the art may adopt various modifications based on the basic technical concepts and teachings of the present invention.

REFERENCE SIGNS LIST 1, 7 rotor, 5 non-magnetic ring, 6, 10 boundary, 21, 31 rotor core, 22, 32, 822, 832 permanent magnet (magnetic pole), 211, 311, 811 protrusion, 51 inner diameter bulging portion, 81 rotor core portion

The invention claimed is:

1. A rotor comprising a plurality of magnetic poles and a step-skew structure with two or more rotor stages comprising a first rotor stage and a second rotor stage, the rotor comprising a rotor core comprising:
a plurality of protrusions disposed around the entire circumference on both sides across a step-skew boundary of the rotor stages which are stacked in a rotor shaft extension direction in which a shaft of the rotor extends; and
a tubular non-magnetic ring mounted on outer peripheries of the plurality of magnetic poles so as to cover the step-skew boundary,
the tubular non-magnetic ring comprising a plurality of inner diameter bulging portions,
wherein the first rotor stage is shifted relative to the second rotor stage by a step-skew angle;
wherein each of the plurality of magnetic poles and each of the plurality of protrusions being in contact with the plurality of inner diameter bulging portions,
wherein a length of each of the protrusions in the rotation shaft extension direction is shorter than a length of each of the magnetic poles in the rotation shaft extension direction, and each of the protrusions in the first rotor stage is partially in contact with the protrusions in the second rotor stage due to the step-skew angle between the first rotor stage and the second rotor stage, and
wherein the protrusions are disposed only on the step-skew boundary of the rotor stages which are stacked in the rotor shaft extension direction.

2. The rotor according to claim 1, wherein each of the protrusions of the rotor core protrudes radially outward with respect to a common tangential line, which is held in contact with a pair of the magnetic poles located adjacent to each other across the protrusion.

3. The rotor according to claim 1, wherein, when a radial distance from a rotation center of the rotor to an outermost portion of the protrusion is represented by L1, and a radial distance from the rotation center of the rotor to an outermost portion of the magnetic pole is represented by L2, L1 is less than or equal to L2.

4. The rotor according to claim 1, wherein, in plan view, an outer peripheral surface of each of the protrusions is formed into an arc shape that is curved so as to bulge radially outward.

5. The rotor according to claim 1,
wherein the rotor core comprising the protrusions is made of a magnetic material, and
wherein a gap exists between each of the protrusions and an immediately adjacent pair of magnetic poles, among the plurality of magnetic poles.

6. The rotor according to claim 1,
wherein a rotor core portion comprising the protrusions is made of a non-magnetic material, and
wherein each of the protrusions is in contact with an immediately adjacent pair of magnetic poles, among the plurality of magnetic poles.

7. The rotor according to claim 1, wherein the plurality of magnetic poles and the plurality of protrusions are arranged at equiangular pitches in a circumferential direction.

* * * * *